Dec. 25, 1956   W. H. RUPP   2,775,636
ALKYLATION PROCESS
Filed June 29, 1951
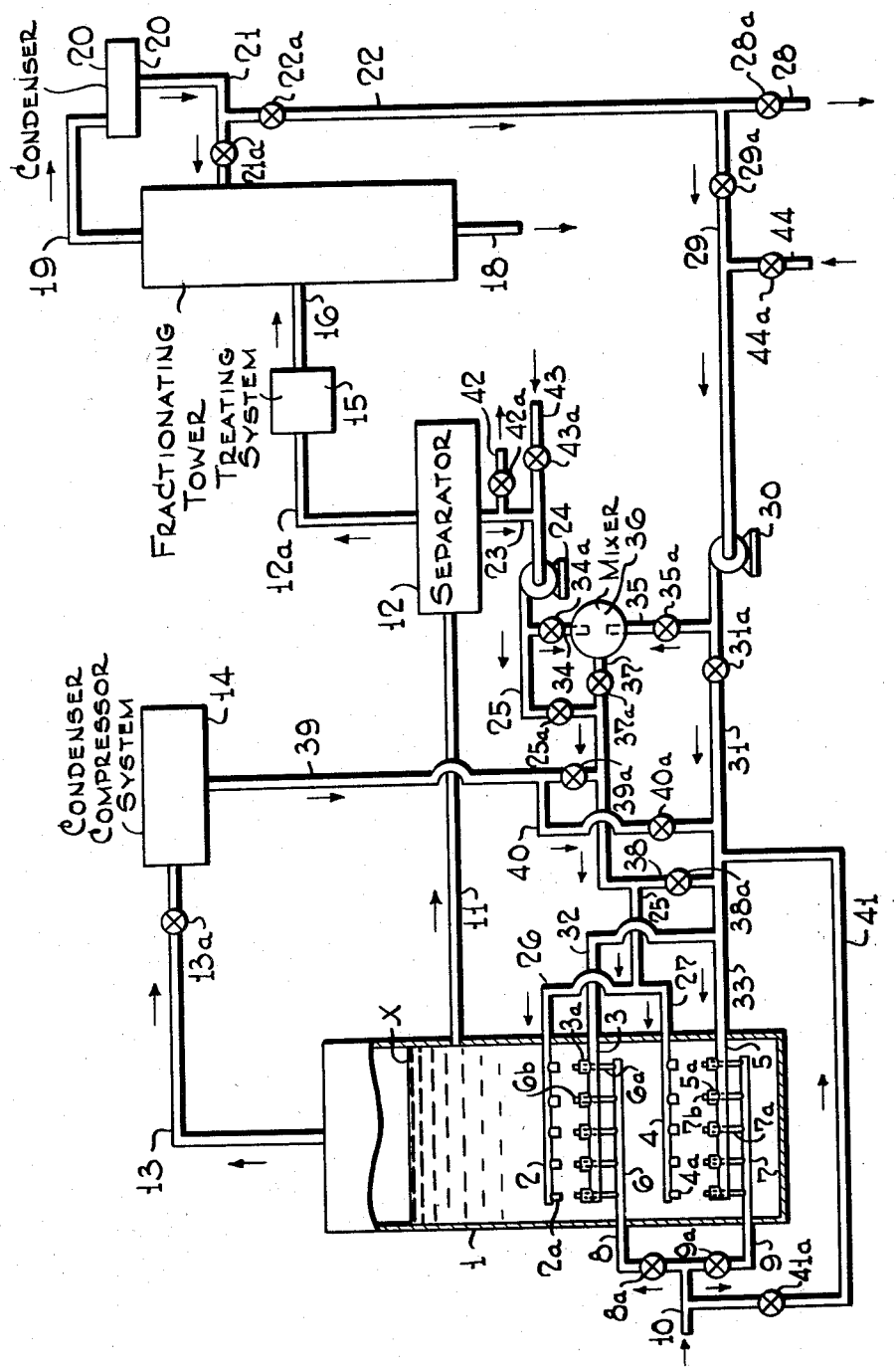
Walter H. Rupp   Inventor
By W. O. J. Heilman   Attorney United States Patent Office 2,775,636
Patented Dec. 25, 1956

2,775,636

ALKYLATION PROCESS

Walter H. Rupp, Mountainside, N. J., assignor to Esso Research and Engineering Company, a corporation of Delaware Application June 29, 1951, Serial No. 234,413

5 Claims. (Cl. 260—683.4)

The present invention relates to a system, including method and apparatus, for effecting synthesis of hydrocarbon materials, as in the manufacture of hydrocarbons having branched chain structures, which are especially suitable as automobile and aviation engine fuels, or as constituents of such fuels. More particularly, the invention relates to a method and means for reacting certain isoparaffin hydrocarbons with olefin hydrocarbons to produce improved yields of branched chain paraffinic hydrocarbons boiling within the gasoline range, and especially for the alkylation of isoparaffins such as isobutane with an olefin such as butylene in the presence of a liquid acid catalyst such as sulfuric acid. The invention while specifically disclosed with reference to the alkylation of isobutane with butylene, in the presence of sulfuric acid as a catalyst, also contemplates similar operations employing other suitable paraffinic and olefinic materials, including isopentane, propylene and amylenes, and other catalyst materials including mixtures of sulfuric and phosphoric acids, hydrofluoric acid, as well as certain complexes of aluminum chloride and boron fluoride.

Characteristically, the olefinic materials contemplated by the present invention, and capable of entering into an alkylation reaction with isoparaffinic hydrocarbons, may also be polymerized by contact with the catalyst materials employed for alkylation. This characteristic is due primarily to the greater reactivity of the olefins as compared with the isoparaffins. In order to avoid the preferential polymerization reaction, or at least to reduce it to a minimum when alkylation is desired, various process expedients have been employed. A most conventional procedure to inhibit concurrent polymerization, as well as to prevent other undesirable secondary or side reactions, has been to effect catalytic alkylation reactions under conditions designed to avoid intimate contact of the olefins with the catalyst material in the comparative absence of isoparaffins. To accomplish this, it has been customary to provide a substantial excess of isoparaffins in the reaction zone or to dilute the olefin material with a material containing a substantially greater amount of isoparaffins prior to introduction into the reaction zone. For example, the olefins may be diluted or mixed with a portion of the emulsion derived from the reaction zone itself and recycled therefrom, or the olefin material may be introduced in successive increments in a continuous series of reaction zones or stages containing previously emulsified and contacted materials. Under such procedures, it is frequently difficult adequately to control the quantities of the various materials introduced, or their relative proportions in any stage, and also the degree of emulsification or mixing which is accomplished from stage to stage. As a result, there may be areas in any particular zone or stage in which the olefins may come in contact with substantially unemulsified or free catalyst materials to produce the undesired polymerization or other side reactions, and thereby to reduce the yield of alkylation products.

It is an object of the present invention to provide a system for carrying out catalytic reactions of the general character contemplated, and especially to provide a method and means for alkylation of isoparaffins with olefins by means of which polymerization and other side reactions are reduced to a minimum with a resulting improvement in the yields of the desired products obtained. It is a further object of the invention to provide a method and means for reacting isoparaffins with olefins in the liquid phase under any desired conditions of temperature and pressure, and in the presence of an active acid catalyst material including sulfuric acid and any other material comparable to these previously mentioned. A desired end result of the system contemplated according to this invention is to produce greater yields of alkylation or other reaction products, which products will be substantially free from side reaction contaminating materials. A particular object of the invention may be stated to be the provision of a system for alkylation of isoparaffins with olefins in the presence of a liquid active acid catalyst material in which the olefins and catalyst materials are introduced in such fashion as to substantially prevent immediate contact of the olefins with the catalyst material to produce polymerization of the olefins to the exclusion of alkylation with isoparaffins. In conjunction with such an objective, it is also an object of the invention to provide an improved method and means for contacting materials of the character contemplated one with another for the purposes set forth. In addition, it is also an object of the present invention to provide a method and apparatus for alkylation as set forth above, in which the extent and requirements for circulating and heat exchange equipment, as well as the piping and conduit connections related thereto and to the other operating elements are reduced to a minimum, and by means of which the production capacity of existing equipment may be increased and the investment cost of new construction reduced.

The invention and its objects may be more fully understood from the following description when read in conjunction with the accompanying drawing illustrating a typical system for alkylation of isobutane with butylene in the presence of sulfuric acid as a catalyst. This system is illustrated in semi-diagrammatic form, including alternate piping and circulation arrangements therefor.

Referring to the drawing in greater detail, the numeral 1 designates a reaction vessel. This vessel may be of any suitable proportions as required by the volume of process materials to be handled, and by the residence time required for the reaction to be carried out therein. For example, in a typical alkylation reaction, the vessel 1 should be of such volume as to permit a residence time of the materials in the reactor vessel of from about 1 minute to about 5 minutes.

In the apparatus as shown, means for introducing process materials into the reaction vessel are provided by conduit members 2, 3, 4 and 5 extended through a wall of the vessel so as to be disposed in substantially parallel paired relation transversely within the vessel. Each of the conduit elements is provided with a plurality of jet nozzle members, 2a, 3a, 4a and 5a respectively, communicating with the respective conduit elements. In each pair, the jet discharge nozzle elements are disposed substantially at right angles to a related conduit member and in substantially aligned, opposed, coaxially spaced relation one to another. The discharge ends of the respective paired nozzle elements are spaced one from another at a distance of from about 1 to about 20 times the internal diameter of the jet or nozzle and preferably within the range of from about 1 to about 5 times such diameter. Conduit members 6 and 7, also extended through one wall of the vessel 1, provide for the introduction of another process material by way of branch lines 6a and 7a opening therefrom and extended through the respective lines 3 and 5 coaxially with the nozzle elements 3a and 5a. Each branch line 6a and 7a terminates in a discharge outlet or nozzle 6b and 7b beyond the outlet of the nozzles 3a and 5a. Preferably, the outlet of a nozzle 6b or 7b is disposed in a plane coincident with that established by the point of impingement of the opposed streams discharged from the respective nozzle elements 2a and 3a and 4a and 5a. The header conduits 6 and 7 are connected as by lines 8 and 9 to a common supply conduit 10. Valves 8a and 9a provide for control of flow to the respective header conduits 6 and 7. An outlet from the reactor 1 for liquid material is provided at an intermediate level by means of conduit 11 connected thereto at one end and to a separator vessel 12 at the other. An outlet for vaporized process materials is provided by means of conduit 13 connected at one end to the upper portion of the reactor 1 and at the other end to a condensing and compression system 14 for the vaporized materials removed through the line 13. Valve 13a is provided in line 13.

The separator or settler vessel 12 may be any conventional type of vessel providing for the separation of an emulsion of immiscible materials into its respective lighter and heavier components. An outlet conduit 12a is provided for removal of the lighter portion of the materials separated in the vessel 12. If desired, additional stages of separation may be employed, although not illustrated. In the apparatus as shown, the conduit 12a is connected to a treating system 15 for neutralization of the materials withdrawn from separator 12. In the operation provided for the lighter component of the emulsion separated in vessel 12 is a fractionable mixture including a product of the reaction carried out in vessel 1, and an excess portion of one of the reactant materials contacted therein. An outlet from the treating system 15 is provided by means of the conduit 16 opening into a fractionating tower 17 providing for separation of the lighter component into a liquid, withdrawn from the tower by way of line 18, and a vaporized material, withdrawn from the tower by way of line 19. The line 19 communicates with a reflux condenser system 20 communicating with the tower at an upper level therein by way of the line 21 and valve 21a. The conduit connection 22 provides for withdrawal of condensate from the line 21. A conduit connection 28 and valve 28a provides for removal of this condensate from the system while conduit connection 29 provides for recirculation thereof to the reactor 1. The conduit 29 communicates with the inlet of pump 30, the outlet of pump 30 in turn discharging into conduit 31 communicating in turn with the lines 32 and 33 connected to header conduits 3 and 5 respectively.

An outlet for the heavier component of the materials separated in the vessel 12 is provided by means of conduit 23 communicating with the inlet of a pump 24. The discharge outlet of the pump 24 is connected to a conduit 25 communicating with lines 26 and 27 in turn connected to the header conduits 2 and 4. Branch conduit lines 34 and 35 opening respectively from the conduits 25 and 31 communicate with a mixing device 36. As shown, this is an opposed jet mixer, the lines 34 and 35 terminating therein in substantially aligned, opposed coaxially spaced relation one to another, or alternately in header members provided with a plurality of jet nozzle elements arranged in similarly spaced, opposed relation. An outlet from the mixer 36 is provided by means of the conduit connection 37 communicating with the line 25. A cross connection between the line 25 and the line 31 is provided by means of conduit 38. Valves 22a, 25a, 29a, 31a, 34a, 35a, 37a and 38a are provided in the respective conduit lines 25, 31, 34, 35, 37 and 38 to control circulation therethrough.

Condensate from the condenser system 14 is removed therefrom by means of conduit 39 connected to the line 25, through valve 39a, and by means of branch line 40, through valve 40a, to the conduit 31. The conduit 10 is also connected to the conduit 31 by means of line 41, through valve 41a. An outlet conduit 42 opening from the conduit 23 through valve 42a provides for withdrawal from the system of any desired portion of the heavier component separated in vessel 12, while inlet conduit 43 opening into the conduit 25 through valve 43a provides for the introduction of additional amounts of said heavier component. An inlet conduit 44 opening into the conduit 29 through valve 44a provides for introduction of additional quantities of one of the process materials supplied to reactor 1. Various accessory equipment including pumps, heat exchangers, automatic controls and the like, which for simplification have been omitted from the drawing may be employed where and as required for the purposes common to their normal functions.

The system as illustrated is suitable for employment under any circumstances in which two or more immiscible materials of different specific gravities are to be contacted, and is particularly useful under circumstances in which such contact is made for the purpose of initiating a chemical reaction involving the materials; in which the reactants and the reaction products may be separated from the catalyst material employed by gravity; and in which the products of the reaction may be removed from any excess of reactant materials by fractionation. More specifically, the system is adapted for employment in the alkylation of isoparaffins with an olefin, in the presence of a liquid active acid catalyst material such as concentrated sulfuric acid. For example, the system is suitable for the alkylation of isobutane and butylene in the presence of sulfuric acid having a strength of from about 90 to about 98%, in which the alkylation reaction is carried out at a temperature of from about 30° to about 60° F. In such a reaction, it is desirable that the isobutane be present in the reactant materials in an amount considerably in excess of the butylene in order to insure complete utilization of the latter material. It is also desirable that the operation provide against uncontrolled polymerization of the butylene component.

In a typical operation, isoparaffins and olefins may be introduced into the system in such proportions as to result in a total feed in which the several components are present substantially as follows:

| Component: | Percent total feed |
|---|---|
| $C_3$ | 3 |
| Butylene | 15 |
| Isobutane | 70 |
| Normal butane | 12 |

Normally, the olefin material initially fed into the system may be supplied by a composition substantially as follows:

| Component: | Percent olefin feed |
|---|---|
| $C_3$ | 1 |
| Butylene | 40 |
| Isobutane | 47 |
| Normal butane | 12 |

In order to accomplish the desired proportions of butylene to isobutane in the reaction mixture, therefore, additional isobutane must be made available from some other source. This material may have a composition substantially as follows:

| Component | Percent isoparaffin feed |
|---|---|
| $C_3$ | 3 |
| Isobutane | 85 |
| Normal butane | 12 |

A suitable feed material also may be obtained by recycling unreacted isobutane as later described.

In operation of the system illustrated by the drawing, as for the alkylation of isoparaffins with olefins, and more particularly for the alkylation of isobutane and butylene, the least reactive process material such as isobutane may be initially introduced into the conduit 29 by way of the conduit 44 passing through the pump 30 and conduits 31, 32 and 33 into the reactor vessel 1 by way of the jets 3a and 5a. At the same time, an acid liquid catalyst material such as sulfuric acid may be introduced by way of conduit 43 through pump 24 into the conduit 23 and conduits 25, 26 and 27 to be discharged into the reactor vessel 1 through header conduits 2 and 4 by way of jets 2a and 4a. The jetted streams of isobutane and sulfuric acid impinging intermediate the spaced jet nozzles will form an emulsion in the reactor vessel. Addition of these materials will be continued to establish a level therein above the outlet provided by the conduit 11, indicated by dotted lines in the drawing and designated by the letter x.

Alternately, by closing the valve 31a and opening the valve 35a, isobutane from the conduit 31 may be passed through the conduit 35 into the mixer 36. At the same time by closing the valve 25a and opening the valve 34a, sulfuric acid from line 25 may also be introduced into the mixer 36. As shown, the mixer being an opposed jet device, the streams of acid and isobutane will be mixed and emulsified by impingement of the streams therein. The emulsion produced will be discharged from the mixing device 36 through the conduit connection 37, valve 37a being open, into the line 25, and beyond the valve 25a. By opening valve 38a, valve 31a remaining closed, the emulsified materials may then be divided into two portions, one of which passes into the conduits 26 and 27 to be discharged through conduits 2 and 4 and the nozzle elements 2a and 4a communicating therewith, while the other portion passes into the conduit 31 beyond the valve 31a and thence through conduits 32 and 33 to be discharged through conduits 3 and 5 by way of the jet nozzles 3a and 5a. Operating in this manner, the materials are principally emulsified by the mixing device 36, and the emulsion improved or maintained by discharge from the jet nozzles as set forth.

Preferably, the opposed streams of materials discharged through the conduits 2, 3, 4 and 5 are of such nature and handled in such fashion as to obtain impinging contact of the streams at a point intermediate the end of the nozzle elements communicating therewith, and so as to produce a saucer-like contact zone intermediate thereof, where the force of contact tends to disperse the material of the respective opposed streams radially as sheets or filaments of the material in intimate surface to surface relationship. Ultimate complete dispersal occurs peripherally of the contact zone into the ambient liquid constituting the main body of materials in the reactor, and producing a region of high turbulence in the immediate vicinity of the saucer-like contact zone. At the same time, each of the opposed jet streams as well as the radially dispersed sheets of the materials in the contact zone itself, will have an induction effect upon the liquids in the surrounding main body of materials in the reactor tending to draw into themselves a certain portion of such surrounding liquids. This induction effect, coupled with high turbulence in the vicinity of the saucer-like dispersal and contact zone, produces intimate remixing and recirculation of materials in the reactor during the period of their residence therein. The effect of impingement of the opposed streams may be further characterized as a planar dispersion effect in which the materials, despite any miscibility or solubility of one with another, tend to form sheets or filaments extending radially outward from the point of impingement and in intimate interfacial contact. A further effect of the form of contact contemplated in this connection is to facilitate the dispersion of heat into the liquid pool surrounding the region of contact where the materials contacted are exothermically reacted, as in the alkylation reaction more particularly contemplated by the present invention. In general, to obtain the operating characteristics of the jetted stream as set forth, and to obtain the desired contact as stated, the operation will be carried on substantially in the manner as set forth with reference to the jet means described in copending applications for United States Letters Patent, Serial No. 208,955, filed February 1, 1951, and Serial No. 224,010, filed May 1, 1951, now U. S. Patent 2,701,184.

With the vessel 1 filled to the intermediate upper level x, in either way described, the olefin material, in this instance butylene, may then be admitted from the conduit 10 through lines 8 and 9 and headers 6 and 7 to be discharged through the nozzle members 6b and 7b, and in each instance at a plane substantially coincident with that established by impingement of the opposed streams discharged from the nozzle members 2a and 3a, and 4a and 5a. By providing for first contact of the butylene with sulfuric acid catalyst in this fashion, and in a zone of high turbulence and intimate association with the isobutane material, the tendency for preferential polymerization of the olefin material is substantially avoided. Operation in this manner provides for initial contact of the highly reactive butylene with the acid catalyst after the catalyst material has been substantially saturated with the less reactive isobutane in such fashion that upon initial contact, some portion of the isobutane is always available to the reaction. Closer control of the reaction is thus obtained, and the formation of undesirable side reaction products is minimized. Under such conditions, the efficiency of the reaction is improved, and contamination and loss of acid strength is reduced.

With the reaction in progress, emulsified materials, including an alkylate as the product, are withdrawn continuously from the vessel 1 by way of line 11 to the separator 12, and there separated into a heavier component, which is the acid catalyst, and a lighter component, which includes the unreacted portion of the least reactive material and the product of the reaction. The former is withdrawn from separator 12 through line 23 and may be recirculated through the system by either of the procedures mentioned above. As required to maintain acid strength, fresh acid may be added by way of line 43, and spent acid withdrawn by way of line 42.

At the same time, the lighter component is continuously withdrawn from the separator 12, by way of line 13, passing therefrom through line 12a into any suitable means for neutralization of residual acidity or entrained acid. It is contemplated that such neutralization may be accomplished by caustic and water washing in conventional fashion, employing conventional equipment for that purpose. From the neutralization step, the lighter compenent materials are removed by way of conduit 16 to the fractionator 17 where the unreacted isoparaffin, in this instance isobutane, is separated from the alkylation product and normal butane, the latter combined materials being removed as a liquid by way of line 18. The isobutane is removed as a vapor by way of line 19, to be condensed in the condenser system 20, condensate being removed therefrom by way of the conduit 21. A portion of this condensate is returned to the fractionator 17 as reflux, while another portion is returned to the reaction system by way of conduits 22 and 29, being handled in the manner previously described with reference to the starting procedure. Make-up fresh feed isoparaffins are supplied to the system by addition to the recycled materials in line 29, by way of conduit 44.

The reaction which takes place in the vessel 1 between the isoparaffin materials, including isobutane, and the olefin butylene, is an exothermic reaction. According to the present invention, the heat of reaction is utilized, at least in part, to vaporize a portion of the excess isoparaffin supplied to the reactor vessel. The vaporized material is withdrawn from the vessel 1 from above the liquid level x by means of the conduit 13, and transferred to the condenser and recompression system indicated in the drawing by the numeral 14. The condensate thus obtained is returned to the reactor vessel by means of the line 39 and line 25, or by way of branch line 40 and line 31, or is divided and recirculated through both lines 25 and 31. By increasing pressure on the material supplied to line 39 slightly above that existing in the vessel 1, the result of a sudden reduction in pressure as discharged into the vessel, plus the effect of the heat of reaction, will produce an auto-refrigeration effect, whereby the temperature of the reaction materials and the reaction may be maintained and controlled as desired.

A further alternate to the operating procedures indicated above, contemplates the premixing of acid and isoparaffin materials in the mixer 36, with the entire output discharged from the mixer being passed through lines 37, 25, 26 and 27, and 2 and 4, to be discharged into the reactor 1 through nozzle elements 2a and 4a, valves 31a, 38a and 39a remaining closed. The total condensate from the condenser system 14, in this instance is directed through line 39, and branch line 40, into conduit 31. Thence, the condensate is discharged into the reactor by way of lines 32 and 33, and 3 and 5 through nozzle elements 3a and 5a into opposed impinging contact with the streams of emulsion discharged from the nozzle elements 2a and 4a. Operating in this fashion, the full auto-refrigeration effect of the isoparaffin condensate is delivered at the zone of initial contact and reaction with the olefin material in the presence of the acid catalyst contained in the emulsion. In addition, and if desired, the olefin material supplied through the conduit 10 may be passed through line 41 in preference to or in addition to lines 8 and 9 to be discharged in admixture with the condensate material.

In a typical operation of the character contemplated, in which isobutane is alkylated with butylene substantially according to the method set forth above, the total amount of materials supplied to the reactor per stream day may be in the amount of from about 70,000 to about 140,000 barrels. Of this total, from about 10,000 to about 40,000 barrels per stream day may be sulfuric acid catalyst, and the balance, the hydrocarbon reactant materials. In the latter category, the isobutane may constitute from 50,000 to about 90,000 barrels per stream day, of which from about 2000 to about 4000 barrels per stream day will be added as make-up material by way of the line 44, while the material added by way of line 10 may constitute up to about 10,000 barrels per stream day of the total hydrocarbon materials, with a butylene content of from about 30% to about 100%.

The isoparaffin materials withdrawn from the reactor 1 as vapors, and employed for auto-refrigeration, may be in the amount of from about 20,000 to about 30,000 barrels per stream day, while of the total quantity of hydrocarbon materials passed from the reactor 1, through separator 12, into the fractionator 17, may be from about 40,000 to about 60,000 barrels per stream day. The isobutane component separated by fractionation in the tower 17, and recirculated through conduit 22 may be from about 30,000 to about 50,000 barrels per stream day, while the product stream removed through conduit 18 may contain about 6000 barrels per stream day of available alkylation product, in addition to normal butane removed therewith.

As previously indicated, the fresh feed isoparaffin material supplied to the system by way of conduit connection 44 may contain from about 70% to about 90% isobutane. The material recirculated by way of conduit 39, for the purpose of auto-refrigeration may contain from about 80% to about 90% isobutane, and that recirculated by way of conduit 22, from about 85% to about 95% isobutane. Normally the reaction will be carried out with temperatures of between about 30° to 60° F. in the reactor vessel 1, and the operation of the auto-refrigeration system contemplated regulated so as to permit the maintenance of temperatures within this range. Preferably, the acid catalyst and hydrocarbon materials as introduced by way of the headers 2, 3, 4, and 5, should be at a temperature in the range of from about 30° to about 100° F. If necessary, heat exchangers may be provided in the respective supply lines for these materials, such as conduits 10, 25, 29, and 31, in order to maintain the desired temperatures of materials supplied therethrough.

What is claimed is:

1. A once-through method of reacting isoparaffinic hydrocarbons with olefinic hydrocarbons in the presence of liquid acid catalyst material for the reaction, to form branched chain saturated hydrocarbons boiling within the gasoline range, and substantially free from polymerization products, in which said reactant materials are contacted in a confined reaction zone, comprising maintaining an emulsified body of said materials and product in said zone with an intermediate upper level therein, continuously vaporizing and withdrawing a portion of unreacted isoparaffinic hydrocarbons from said zone above the liquid level therein, continuously withdrawing a portion of the emulsified materials from said zone, separating said materials into a heavier component comprising said acid catalyst, and a lighter component comprising said reactant materials and the reaction product substantially free of catalyst material, fractionating said lighter component to recover therefrom a product component and a second component consisting of unreacted isoparaffinic hydrocarbons, recycling a stream of said recovered isoparaffinic hydrocarbons to said reaction zone, continuously recycling a stream of said separated heavier component comprising said acid catalyst to said reaction zone, continuously condensing the vaporized isoparaffinic material withdrawn from said reaction zone and recycling the condensed isoparaffinic material to said reaction zone, the streams of said isoparaffinic material and of said acid-containing heavier component being introduced into said reaction zone as a plurality of opposed, paired jets in impinging contact one with another within the body of materials in said zone, at least a portion of said jetted streams comprising a mixture of said acid catalyst and said isoparaffinic hydrocarbon material, and continuously jetting said olefinic hydrocarbon into said emulsified body directly between said opposed jet streams at a plane substantially coincident with that established by impingement of said opposed jets.

2. A method according to claim 1, in which said recycled isoparaffinic material is combined with said recycled acid catalyst component to form said acid-isoparaffinic mixture, said mixture being divided into two separate streams which are introduced into said reaction zone as said plurality of opposed, paired jets, in conjunction with condensate of the vaporized material withdrawn from said reaction zone.

3. A method according to claim 2, in which said condensate is initially combined with acid-isoparaffin mixture before division into separate streams.

4. A method according to claim 2, in which said condensate is combined with only one of the divided streams of the acid-isoparaffin mixture.

5. The process according to claim 1 wherein the isoparaffin is isobutane, the olefin is butylene and the catalyst is sulfuric acid.

References Cited in the file of this patent

UNITED STATES PATENTS

| | | |
|---|---|---|
| 1,394,486 | Foster | Oct. 18, 1921 |
| 2,082,034 | Smith | June 1, 1937 |
| 2,361,465 | Filbert | Oct. 31, 1944 |
| 2,366,627 | Kemp | Jan. 2, 1945 |
| 2,428,506 | Van der Valk | Oct. 7, 1947 |
| 2,435,028 | Bradley | Jan. 27, 1948 |
| 2,463,262 | Goldsby | Mar. 1, 1949 |
| 2,505,644 | McAllister | Apr. 25, 1950 |
| 2,509,288 | Brochner | May 30, 1950 |